W. L. FEES.
NUT LOCK.
APPLICATION FILED MAR. 5, 1921.

1,410,290.  Patented Mar. 21, 1922.

INVENTOR
WILLIAM L. FEES
BY Richey Lough + Hales
HIS ATTORNEYS.

UNITED STATES PATENT OFFICE.

WILLIAM L. FEES, OF ELYRIA, OHIO.

NUT LOCK.

1,410,290. Specification of Letters Patent. Patented Mar. 21, 1922.

Application filed March 5, 1921. Serial No. 449,634.

*To all whom it may concern:*

Be it known that I, WILLIAM L. FEES, a citizen of the United States, residing at Elyria, in the county of Lorain and State of Ohio, have invented certain new and useful Improvements in Nut Locks; and I do hereby declare the following to be a full, clear, concise, and exact description of the invention, such as will enable others skilled in the art to which it appertains to make and use the same.

My invention relates to nut locks, and more particularly to that type of nut locks wherein a nut is maintained in set position upon a bolt end after having been tightly turned up thereon, such nut being held against loosening due to vibration, jolts, jars and the like, the same being accomplished without providing a bolt of special design, the nut lock of my invention being applicable to any well known type of bolt. The invention comprises as novel elements a nut and washer in combination, having co-operating engaging portions whereby relative movement of the nut and washer is prevented in such a direction as would tend to separate the nut from the washer.

My invention will be better understood by reference to the drawings forming a part of this specification, and in which drawings—

Figure 1:
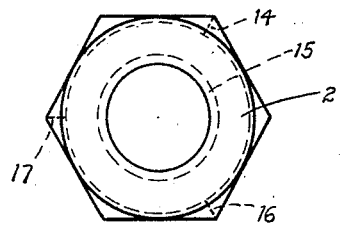
Fig. 1 shows a top plan view of a nut embodying a portion of my invention.
Figure 2:
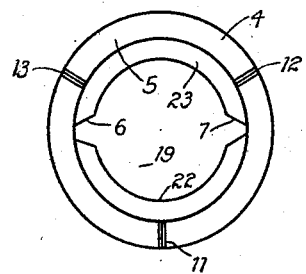
Fig. 2 shows a bottom plan view of my improved washer.

Referring now to the drawings, in all of which like parts are designated by like reference characters, at 2 I show a nut having a threaded inner wall 15, the outer wall being of any preferred shape, that of the embodiment illustrated in the drawing being hexagonal in horizontal sections. The top surface of the nut may be straight, as shown, or any other desired shape, and the bottom wall or end of the nut has a curved portion 18, the curvature extending from the inner threaded wall of the nut nearly to the outer wall thereof. Upon the bottom (as viewed in Fig. 3) end of the nut, and near its edges, is provided a plurality of ratchet teeth projecting downwardly from the surface of the bottom end of the nut, said teeth being equally spaced, and being preferably either three or six in number, the embodiment of my invention illustrated showing three such teeth. My reason for determining upon three such teeth, or six, if desired, is that with a hexagonal nut, as shown, these teeth may be disposed on the bottom surface adjacent the corners, which are six in number, and in the embodiment illustrated said teeth being disposed at alternate corners.

These teeth having a vertical ratchet holding face and an inclined lower surface. The washer comprising the holding means for the said nut, in combination with the said nut teeth, which are illustrated at 14, 16 and 17, is shown at 4, said washer being annular in shape, the interior opening 19 being adapted to fit over the end of a bolt, said opening being embraced by an adjacent upwardly and inwardly extending curved spring portion having spring member 22 and 23, said spring members being carried upon an outwardly extending flange portion 5, constituting the main body of the washer. The spring members 22 and 23 are separated by slots 6 and 7, which adds to the elasticity of each spring member, enabling it to move independently of the other under the compressive stress exerted by the nut when the nut is placed over the washer and turned up tightly thereagainst.

The washer 4 has its outer flange main body portion of flattened shape, but at equally spaced portions on its upper surface are notches 8, 9 and 10 adapted to receive the ratchet teeth 14, 16 and 17 of the nut when the nut is in place over the washer upon a bolt. The washer 4 on its bottom surface has teeth 11, 12 and 13, which when the washer is tightly clamped by the nut against the surface of a secured member, such as the beam 25 shown in Fig. 3, will bite into the material of the said beam to grip the same and prevent relative rotation of the washer and the beam or other secured member.

The upwardly and inwardly curved spring member 22 and 23 may be of such shape as deformed truncated sections of substantially concentric spheroids, or they may be sections of other more regularly shaped elements than spheroids, but with outer curved walls. It is, however, an object of my invention to so shape the members 22 and 23 that while being somewhat stiff, they still may be sufficiently resilient that they may have their inner ends deflected toward the bolt when the nut 2 is screwed down on the bolt, the bottom curved surface 18 of the nut engaging the curved surface 26 of the washer, and so also as to make up for the longitudinal movement which the nut 2 may have upon the bolt 1, due to the engaging threads of the nut and bolt not fitting tightly.

It will be observed that the engaging faces of the nut and washer are both curved, the washer being convexly curved and the nut having a concave curvature, the curvature of the nut face being different from that of the engaged washer face. This is done so as to provide a camming action between the opposing faces of the nut and washer, and the washer spring members 22 and 23 being flexible have their inner face curved inwardly by virtue of this camming action, at the same time by their resiliency exerting a retractive effort against the bottom curved surface of the nut.

In use the washer is simply placed over the end of the bolt and against the member, such as the beam 25, to be clamped, the bolt 1 extending through on opening 24 through the said beam, and the threaded nut is turned down upon the threaded end of the bolt tightly with a wrench, until tightly secured, at which time, due to the resiliency of the curved spring member 22 and 23, the teeth 14, 16 and 17 of the nut will be seated within the notches 8, 9 and 10. Relative movement of the nut in the opposite direction from that in which it was turned when being put into place will then be prevented by the action of the ratchet vertical faces of the teeth on the nut and washer engaging, there being no such camming action by such faces of such teeth as by the more oblique top and bottom faces of the ratchet teeth on washer and nut respectively as when the nut was turned into place.

Figure 3:
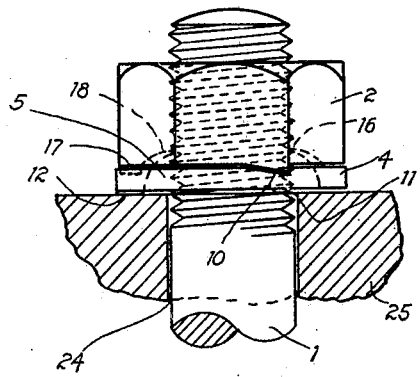
Fig. 3 shows a side elevation of a bolt end upon which end the nut and washer of my invention are shown in place, the nut being threaded upon the end of the bolt and the washer being pressed by the said bolt between the surface of a perforated beam.
Figure 4:
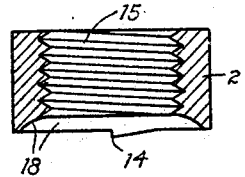
Fig. 4 shows a vertical cross-sectional view of the nut illustrated in Fig. 1, the same being taken through the middle of the nut.
Figure 5:
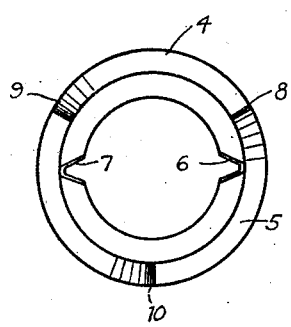
Fig. 5 shows a top plan view of the washer illustrated in Fig. 2.
Figure 6:
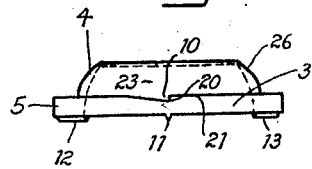
Fig. 6 shows a side elevational view of the said washer.

Having thus described my invention, I wish it to be understood that when speaking of top and bottom ends or faces of the nut or of the washer, this is done with reference to the nut and washer being placed in such a position as is illustrated in Fig. 3, it being understood that these relative positions may be reversed, or the bolt may be placed horizontally, or in any other desired position, thus altering the terminology which would in such cases need to be employed to define such faces so placed.

I also wish it to be understood that numerous and extensive departures may be made from the form of my invention herein illustrated and described, but without departing from the spirit of my invention.

What I claim is:

1. In combination, a nut lock comprising a nut having a threaded inner wall adapted to be secured on a threaded bolt, a washer adapted to encircle the said bolt, having an outer flange substantially parallel to the horizontal axis of the said bolt, said outer portion carrying a plurality of inner upwardly and inwardly extending curved spring members, said nut having an end wall, the inner portion of the said end wall adjacent the threaded opening through the nut being concavely curved, the border portion of the said end wall having formed thereon a plurality of ratchet teeth, said ratchet teeth being located equidistant from each other, said washer having ratchet notches equal in number to the said nut ratchet teeth, said teeth being adapted to register within the said notches when the said bolt and washer are secured tightly in place upon a nut, the washer curved spring members being adapted by their inherent resiliency to have their ends deflected inwardly and downwardly by the engaging concavely curved portion of the said nut, and means to prevent rotation of the said washers.

2. In combination, a locking nut mechanism, comprising a nut, a washer, a threaded bolt, said nut being adapted to be threaded on the bolt, said washer having a peripherally located portion which is substantially rigid, and an inner, upwardly extending, relatively flexible portion adapted to be compressed by the said nut, and rigid ratchet teeth and adjoining ratchet depressions on both said nut clamping surface and said washer peripheral portion, the teeth of each pointing oppositely, and adapted to fit within the depressions of the other, the oppositely pointing ratchet teeth of each having faces adapted to prevent relative rotation of the nut and washer in one direction.

3. In combination, a locking nut mechanism, comprising a nut, a washer, a threaded bolt, said nut being adapted to be threaded on the bolt, said washer having a peripherally located portion which is substantially rigid, and an inner, upwardly extending, relatively flexible portion adapted to be compressed by said nut, and rigid ratchet teeth and adjoining ratchet depressions on both said nut clamping surface and said washer peripheral portion, the teeth of each pointing oppositely, and adapted to fit within the depressions of the other, the oppositely pointing ratchet teeth of each having faces adapted to prevent relative rotation of the nut and washer in one direction, said flexible portion of said washer being generally of the form of a truncated section of a hemisphere taken near the base thereof.

4. In combination, a locking nut mechanism, comprising a nut, a washer, a threaded bolt, said nut being adapted to be threaded on the bolt, said washer having a peripherally located portion which is substantially rigid, and an inner, upwardly extending, relatively flexible portion adapted to be compressed by the said nut, and rigid ratchet teeth and adjoining ratchet depressions on both said nut clamping surface and said washer peripheral portion, the teeth of each pointing oppositely, and adapted to fit within the depressions of the other, the oppositely pointing ratchet teeth of each having faces adapted to prevent relative rotation of the nut and washer in one direction, said flexible portion being deeply notched to permit independent movement of the two separated portions.

5. In combination, a locking nut mechanism, comprising a nut, a washer, a threaded bolt, said nut being adapted to be threaded on the bolt, said washer having a peripherally located portion which is substantially rigid, and an inner, upwardly extending, relatively flexible portion adapted to be compressed by the said nut, and rigid ratchet teeth and adjoining ratchet depressions on both said nut clamping surface and said washer peripheral portion, the teeth of each pointing oppositely, and adapted to fit within the depressions of the other, the oppositely pointing ratchet teeth of each having faces adapted to prevent relative rotation of the nut and washer in one direction, said washer having teeth on its face opposite the nut engaging face to prevent its rotation.

In witness whereof, I have hereunto signed my name.

WILLIAM L. FEES.